Jan. 30, 1962  J. R. COSBY  3,019,397
PRESSURE RESPONSIVE DEVICE COMBINED WITH
POSITIVE FEEDBACK OSCILLATOR CIRCUIT
Filed Sept. 3, 1958
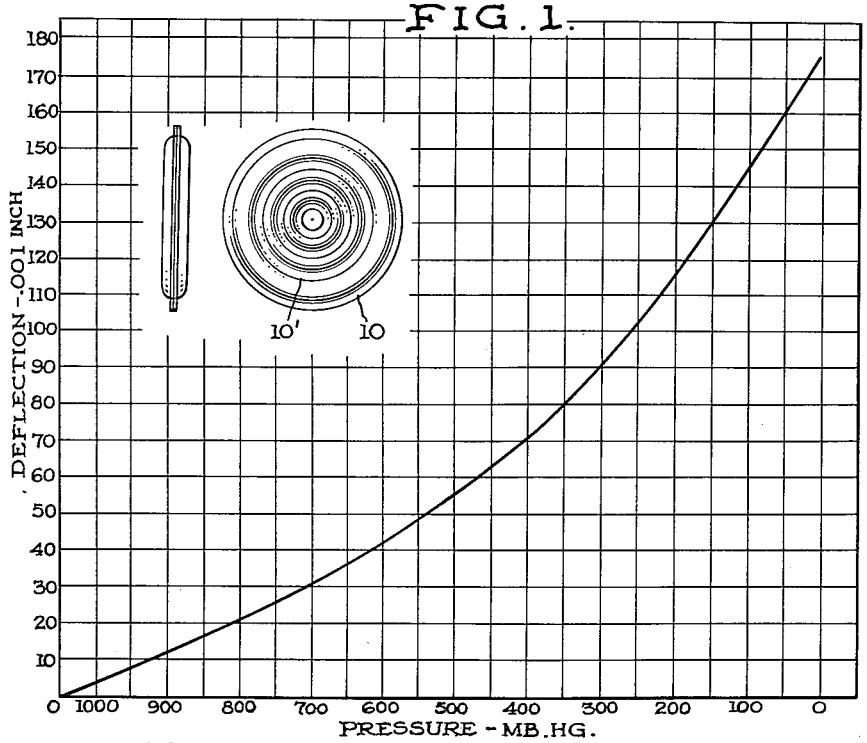
FIG. 1.
FIG. 2.     FIG. 3.
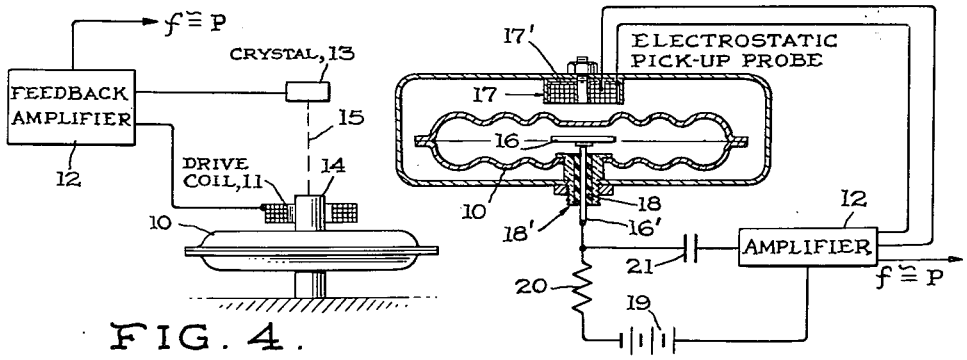
FIG. 4.
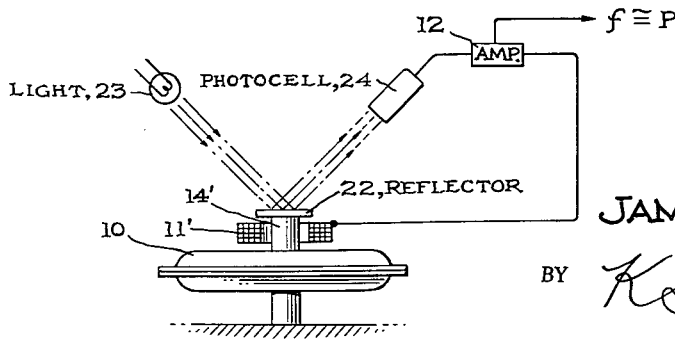
INVENTOR
JAMES R. COSBY
BY K. G. Doub
ATTORNEY

3,019,397
PRESSURE RESPONSIVE DEVICE COMBINED WITH POSITIVE FEEDBACK OSCILLATOR CIRCUIT

James R. Cosby, Towson, Md., assignor to The Bendix Corporation, a corporation of Delaware
Filed Sept. 3, 1958, Ser. No. 758,840
5 Claims. (Cl. 331—65)

This invention relates to a device for sensing gaseous or fluid pressures and converting increments of same into electrical energy which may be expended in transmitting information concerning the pressures being sensed. The device in its simplest form combines a particular type of pressure-responsive diaphragm or capsule with a positive feedback electric oscillator circuit. Thus the diaphragm or capsule has a variable spring rate throughout the range of pressures for which it is adapted, and for each increment of pressure there is a specific finite spring rate. This variable spring rate characteristic distinguishes diaphragms of this type from those wherein the response is linear with changes in pressure and hence the spring rate must be substantially constant throughout the pressure range.

A transducer of the type contemplated herein has a relatively wide field of use. For example, it may function in the telemetering field to sense changes in altitude in terms of pressure which in turn are converted into electrical energy in the form of pulses of varying frequency for modulating a radio frequency carrier wave serving to transmit the desired information to a ground station; as an altimeter for convenient installation in aircraft instrument panels, or as an aircraft collision-warning device functioning on the comparison-of-frequnecy principle; as a high-precision pressure switch; as a remote reading gage to measure the density of fluids or the pressure of gases in an enclosure; as a testing device in laboratory work, and other uses where pressure measurement is desirable. In many installations, the improved pressure transducer will serve as a simple and more efficient substitute for a device performing a similar function.

The primary object of the present invention therefore is to provide a pressure transducer which is characterized by its simplicity, freedom from calibration errors due to handling, shock and temperature or other environmental conditions and which may be made compact and light in weight and involves few parts and less driving energy than known present-day devices for performing similar functions.

In the drawing:

FIG. 1 is a curve chart illustrating the action of a pressure-responsive capsule having a variable spring rate, an example of such capsule being shown as an inset;

FIG. 2 is a schematic diagram of a pressure transducer in accordance with the present invention; and FIGS. 3 and 4 are views similar to FIG. 1 of modified types of oscillator circuitry.

Referring to FIG. 1, the capsule 10 shown within the confines of the chart is made up of a pair of diaphragms or half-shells secured together at their meeting edges as by welding or soldering. When used to sense changes in altitude, such a capsule would be evacuated and/or charged with an inert gas at some predetermined pressure. Diaphragms having a given non-linear deflection-versus-pressure characteristic may be fabricated by different processes. A diaphragm which has been found to operate satisfactorily in the system herein disclosed is one made of Ni-Span C steel alloy. Assuming a given thickness of metal and temper or hardness, the shallower the corrugations or convolutions 10′ the more non-linear will be the curve of FIG. 1, which illustrates the deflection-versus-pressure characteristic of a capsule made up of a pair of Ni-Span C diaphragms. A diaphragm of this type may be considered as comprising a mass M, a characteristic spring rate K, and a particular resonant frequency F. The damping characteristic D is very low, which means that little feedback energy is required to keep the system oscillating.

Depending upon the design of the capsule, various spring rates can be obtained. For example, it can be assumed that the spring rate is defined by $K=CP$, where C is a constant for the particular design and P the pressure.

In a mechanical system of this type:

$$F = \frac{1}{2\pi}\sqrt{\frac{K}{M} - \frac{D^2}{4M^2}} \quad (1)$$

which reduces to $$F = \frac{1}{2\pi}\sqrt{\frac{K}{M}}$$

where $$\frac{D \ll 1}{4M} \quad (2)$$

(For low damping)
Since $K=CP$; then $$F = \frac{1}{2\pi}\sqrt{\frac{CP}{M}} \quad (3)$$

Thus it is apparent that the capsule has a particular frequency of oscillation for any given pressure or altitude.

Since Ni-Span diaphragm material is magnetic, the capsule or diaphragm may be excited and maintained in a state of oscillation by circuitry such as shown in FIGS. 2, 3 and 4 of the drawing.

In FIG. 2 the system comprises a capsule 10, a drive coil 11, a feedback amplifier 12 and a crystal oscillator 13 interconnected by suitable circuitry illustrated in diagrammatic form. The center of the capsule 10 is provided with a stud 14, made of material enabling it to function as a magnetic armature, the same being mechanically connected to the crystal 13 as indicated at 15, so as to subject the crystal to mechanical vibrations and feed an E.M.F. to the amplifier 12 proportional to the frequency of oscillation of the capsule 10.

The operation will be obvious. The drive coil 11 and its armature 14 function as an electric means for sustaining mechanical vibrations. Since the capsule 10 has a particular frequency for each increment of pressure, the varying frequencies existing at various pressures will be transmitted to the crystal 13, at which point they are converted into an E.M.F. and fed to the amplifier 12, which will put out signals corresponding to said frequencies. The output of the amplifier could be used to modulate a carrier wave put out by a radio frequency oscillator in a telemetering circuit to indicate changes in altitude, part of the output being fed back to the drive coil 11 to maintain the diaphragm in a state of oscillation and the circuit in resonance at any given pressure.

FIG. 3 illustrates a drive circuit utilizing an electrostatic pickup probe in the form of a plate-shaped electrode 16 located on one side of the diaphragm (interiorly of the capsule 10) and a magnetic field-producing means in the nature of a solenoid 17 located on the opposite side of the diaphragm. The plate 16 is fixed on a stem 16′ which projects through an insulating seal 18, carried by a hollow nut 18′, anchored to the mounting case or housing of the unit. The plate 16 is positively charged from a suitable source of potential, such as the battery 19, across dropping resistor 20, said plate being connected to the input of the amplifier 12 across coupling capacitor 21.

When the upper diaphragm vibrates as the result of the capsule being subjected to varying pressures, the electrostatic charge on the plate 16 will vary in magnitude in relation to the magnitude of vibration and in polarity with each vibration, thereby feeding an alternating voltage to the amplifier 12. Part of the amplified output is fed back to the coil 17' of the solenoid 17, thereby setting up a magnetic field which varies with each vibration in magnitude and polarity, the central area of the diaphragm functioning in the nature of the movable armature of the solenoid. This circuit has the advantage of avoiding any appreciable loading effect on the upper diaphragm, and it also permits a limited range of vibration of the lower diaphragm. It will be noted that a compensating drive control is afforded by the circuit of FIG. 3. Thus when the diaphragm is at its closest point to the solenoid 17, the pickup plate or electrode 16 is at its remotest point from the diaphragm, and vice versa. In this manner, the circuit obeys the inverse laws and therefore affects the circuit gain in a compensating manner, i.e. when the electrostatic charge on the plate 16 is at its weakest the magnetic field in the solenoid is at its strongest value.

Instead of using a single pickup plate or electrode 16 in conjunction with a drive coil or solenoid 17, a pair of electrostatic plates could be arranged in spaced relation on opposite sides of the diaphragm, in which event the electrostatic field in the region of the plates would vary in density as a function of the magnitude of vibration and in polarity with each vibration, the frequency resulting from the vibration of the capsule being picked up by the internal plate and a portion of the amplified potential fed back to the outer plate, thereby maintaining the capsule in a state of oscillation.

In FIG. 4 another type of oscillating circuit is shown. In this instance, a mirror or light-reflecting element 22 is attached to the stud or armature 14' of the upper wall of the diaphragm 10 and is located so that light rays from a source 23 strike the mirror at an angle. As the diaphragm vibrates, the mirror is displaced as a function of the frequency of vibration, to thereby vary the intensity of the light striking a photocell 24, which feeds a proportional E.M.F. to the amplifier 12. As in FIG. 2, a portion of the amplified voltage is fed back to the drive coil 11 to maintain the capsule in a state of oscillation.

From the foregoing, it will be obvious that the resonant frequency of any one of the circuits illustrated will be proportional to pressure; and when used to sense changes in altitude the resonant frequency will be inversely proportional to altitude. One means of converting the frequency of the system to a corresponding pressure would be to time the period of one oscillation. Also, it is possible to shock-excite a diaphragm capsule or shell and then measure the frequency produced after shock excitation.

The improved pressure transducer constitutes a highly simplified yet accurate means of sensing and measuring pressures in contradistinction to those utilizing vibrating wires and the like; it obviously can be made extremely compact and is capable of being installed in a restricted space, which makes it a valuable item for use in aircraft, rockets, nuclear missiles, etc.

What I claim is:

1. In a pressure transducer, a diaphragm having a variable springe rate throughout a given range of deflection and a given frequency of oscillation for each different increment of pressure to which it may be subjected, and means for converting mechanical oscillations into an electrical output having a frequency proportional to said oscillations comprising an electric circuit including a magnetic armature fixed to said diaphragm substantially centrally thereof, a drive coil operatively related to said armature, an amplifier, an electrical transducer connected between said armature and amplifier for converting mechanical oscillations into an electrical motive force, and means for feeding a portion of the amplified output back to said drive coil to maintain the circuit in a state of resonance.

2. In a pressure transducer, a diaphragm treated to obtain a varying spring rate throughout its range of deflection and a given frequency of oscillation for each different increment of pressure to which it may be subjected, means for converting mechanical oscillations into an electrical output having a frequency proportional to said vibrations comprising electro-magnetic means located adjacent one side of said diaphragm which when energized acts on the diaphragm to sustain mechanical vibrations, an electrostatic pick-off probe located on the opposite side of said diaphragm in cooperative relation to said diaphragm and said electro-magnetic means, and an electric circuit including an amplifier having its input connected to said probe and a feedback connection from its output to said electro-magnetic means.

3. A pressure transducer as claimed in claim 2 wherein said diaphragm is made at least in part of magnetic material and said electro-magnetic means consists of a solenoid which acts on said diaphragm to sustain the mechanical oscillations thereof.

4. In a pressure transducer, a pressure-responsivt diaphragm treated to obtain a variable spring rate throughout its range of deflection and to have a given frequency of oscillation for each different increment of pressure to which it may be subjected, and an electric circuit for converting mechanical oscillations into an electrical output having a frequency proportional to pressure including a magnetic armature and associated light reflector fixed to said diaphragm substantially centrally thereof, a drive coil operatively related to said armature, a light source and a photocell operatively related to said reflector, and an amplifier having its input receiving electrical energy from said photocell and its output connected in positive feedback relation to said drive coil.

5. In a pressure transducer, a diaphragm of magnetic metallic material having a non-linear deflection versus pressure characteristic producing a variable spring rate throughout a given range of deflection and a given frequency of oscillation for each different increment of pressure to which it may be subjected, means for converting mechanical oscillations of said diaphragm into an electrical output having a frequency proportional to said oscillations comprising electromagnetic means located adjacent one side of said diaphragm which, when energized, acts on the diaphragm to sustain mechanical vibrations, a transducer having an electrical output responsive to movement of said diaphragm, and an electric circuit including an amplifier having its input connected to said transducer and a feedback connection from the output of said amplifier to said electromagnetic means.

References Cited in the file of this patent

UNITED STATES PATENTS

| | | |
|---|---|---|
| 1,995,305 | Hayes | Mar. 26, 1935 |
| 2,289,183 | Ehret et al. | July 7, 1942 |
| 2,444,218 | Carnahan | June 29, 1948 |
| 2,662,408 | Ellison | Dec. 15, 1953 |
| 2,847,625 | Popowsky | Aug. 12, 1958 |
| 2,891,159 | Politi et al. | June 16, 1959 |